US012744922B2

(12) United States Patent
Zhang et al.

(10) Patent No.: US 12,744,922 B2
(45) Date of Patent: Sep. 22, 2026

(54) VIDEO DATA PROCESSING METHOD, SYSTEM, AND APPARATUS, AND COMPUTER READABLE STORAGE MEDIUM

(71) Applicant: Suzhou MetaBrain Intelligent Technology Co., Ltd., Suzhou (CN)

(72) Inventors: Zhenlei Zhang, Suzhou (CN); Tuo Li, Suzhou (CN); Hongtao Man, Suzhou (CN); Tongqiang Liu, Suzhou (CN); Yulong Zhou, Suzhou (CN); Xiaofeng Zou, Suzhou (CN); Xiankun Wang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 132 days.

(21) Appl. No.: 18/725,647

(22) PCT Filed: Aug. 30, 2022

(86) PCT No.: PCT/CN2022/115726
§ 371 (c)(1),
(2) Date: Jun. 28, 2024

(87) PCT Pub. No.: WO2023/197507
PCT Pub. Date: Oct. 19, 2023

(65) Prior Publication Data

US 2025/0071302 A1 Feb. 27, 2025

(30) Foreign Application Priority Data

Apr. 11, 2022 (CN) ........................ 202210371374.9

(51) Int. Cl.
*H04N 19/176* (2014.01)
*H04N 19/186* (2014.01)
*H04N 19/423* (2014.01)

(52) U.S. Cl.
CPC ......... *H04N 19/423* (2014.11); *H04N 19/176* (2014.11); *H04N 19/186* (2014.11)

(58) Field of Classification Search
CPC ... H04N 19/423; H04N 19/176; H04N 19/186
(Continued)

(56) References Cited

FOREIGN PATENT DOCUMENTS

CN 111355962 A 6/2020
CN 112839231 A 5/2021
(Continued)

OTHER PUBLICATIONS

CN112929672 Machine Translation (Year: 2021).*
(Continued)

*Primary Examiner* — Nguyen T Truong
(74) *Attorney, Agent, or Firm* — Crowell & Moring LLP

(57) ABSTRACT

A video data processing method, system and apparatus, and a computer readable storage medium are disclosed. The video data processing method includes: when a reading signal is received, determining a storage space where video data to be compressed corresponding to the reading signal is located; in response to a determination that the storage space is a DDR storage space, reading video data of a plurality of Blocks from the DDR storage space, sending the video data to be compressed in the video data to a compression module for compression, and storing video data other than the video data to be compressed into a RAM storage space; and in response to a determination that the storage space is the RAM storage space, reading the video data to be compressed from the RAM storage space, and sending the video data to be compressed to the compression module for compression.

19 Claims, 5 Drawing Sheets

(58) Field of Classification Search
USPC .................................................... 375/240.12
See application file for complete search history.

(56) References Cited

FOREIGN PATENT DOCUMENTS

| | | | | |
|---|---|---|---|---|
| CN | 112929672 | * | 6/2021 | ........... H04N 19/426 |
| CN | 112929672 | A | 6/2021 | |
| CN | 113242434 | A | 8/2021 | |
| CN | 102223543 | A | 10/2021 | |
| CN | 113573072 | * | 10/2021 | ........... H04N 19/423 |
| CN | 113709489 | A | 11/2021 | |
| CN | 114051145 | A | 2/2022 | |
| CN | 114466196 | A | 5/2022 | |

OTHER PUBLICATIONS

CN113573072 Machine Translation (Year: 2021).*
International Search Report of corresponding PCT application (PCT/CN2022/115726)) Nov. 25, 2022 including English translation (5 pages).
Written Opinion of corresponding PCT application (PCT/CN2022/115726)of corresponding PCT application (PCT/CN2022/115726)) Nov. 25, 2022 including English translation (11 pages).
Search report of corresponding CN priority application (CN202210371374.9) May 12, 2022 (1 page).
First Office Action of corresponding CN priority application (CN202210371374.9) May 18, 2022 including English translation (13 pages).
Notification to Grant Patent Right for Invention of corresponding CN priority application (CN202210371374.9) Jun. 6, 2022 including English translation (2 pages).

* cited by examiner non-transitory computer readable storage medium

Computer readable instruction

FIG. 8

VIDEO DATA PROCESSING METHOD, SYSTEM, AND APPARATUS, AND COMPUTER READABLE STORAGE MEDIUM

CROSS-REFERENCE TO RELATED APPLICATION

This application is the national phase application of International Application No. PCT/CN2022/115726, filed Aug. 30, 2022, which claims priority to Chinese Patent Application No. 202210371374.9, filed on Apr. 11, 2022 in China National Intellectual Property Administration and entitled "Video Data Processing Method, System and Apparatus, and Computer Readable Storage Medium". The contents of International Application No. PCT/CN2022/115726 and Chinese Patent Application No. 202210371374.9 are incorporated herein by reference in their entireties.

FIELD

The present application relates to the field of video transmission, in particular to a video data processing method, system and apparatus, and a computer readable storage medium.

BACKGROUND

In a traditional baseboard management control chip, a processing flow of a video compression system is shown in FIG. 1. A video graphics array (VGA) converts initial video data transmitted from a host terminal into video data in an RGB (Red, Green, Blue) format. A conversion module performs color space conversion on the video data in the RGB format to obtain video data in a YUV format, and the video data in the YUV format is written to a storage space of an off-chip double data rate (DDR). A compression module reads the video data in the YUV format from the off-chip DDR in the order of Blocks, performs compression processing, and writes the compressed video data to the off-chip DDR. Then a network driver operated by a central processing unit (CPU) reads a command of video data compression, and sends the command to a remote terminal for decoding and display through a network, so as to realize remote monitoring and management.

The inventor realized that in a traditional solution, there are two reasons for writing the video data to the off-chip DDR: avoid a delay in processing by downstream module, and the video data of the host terminal is continuously generated. Therefore, the video data needs to be written to the DDR for caching; and YUV data is required to be cached in order to perform Block conversion before compression since data is required to be inputted in the form of Blocks instead of being inputted in rows during video compression. In the traditional solution, the YUV data is required to be written to the off-chip DDR first and then read back to an in-chip DDR from the off-chip DDR repeatedly. Therefore, the occupancy rate of a DDR bus is very high, and because of short packet reading of the DDR, and the use efficiency of the DDR is very low, which seriously affects the access of other applications in the system to the DDR, thereby reducing the performance of the entire system.

Therefore, how to provide a solution to the above-mentioned technical problems is a problem to be solved by a person skilled in the art at present.

SUMMARY

According to various embodiments disclosed in the present application, a video data processing method, system and apparatus, and a computer readable storage medium are provided.

A video data processing method includes: receiving a reading signal, and determining a storage space where video data to be compressed corresponding to the reading signal is located; in response to a determination that the storage space is a DDR storage space, reading video data of a plurality of Blocks from the DDR storage space, sending the video data to be compressed in the video data to a compression module for compression, and storing video data other than the video data to be compressed in the video data of the plurality of Blocks into a random-access memory (RAM) storage space; and in response to a determination that the storage space is the RAM storage space, reading the video data to be compressed from the RAM storage space, and sending the video data to be compressed to the compression module for compression.

A video data processing system includes: a determination module, configured to determine, in response to a reading signal being received, a storage space where video data to be compressed corresponding to the reading signal is located; a first processing module, configured to read, in response to a determination that the storage space is a DDR storage space, video data of a plurality of Blocks from the DDR storage space, send the video data to be compressed in the video data to a compression module for compression, and store video data other than the video data to be compressed in the video data of the plurality of Blocks into a RAM storage space; and a second processing module, configured to read, in response to a determination that the storage space is the RAM storage space, the video data to be compressed from the RAM storage space, and send the video data to be compressed to the compression module for compression.

A video data processing apparatus includes: a memory and one or more processors. The memory is configured to store computer readable instructions. The one or more processors are configured to perform the steps of the video data processing method when executing the computer readable instructions.

A non-transitory computer readable storage medium is provided. The non-transitory computer readable storage medium has computer readable instructions stored therein. The computer readable instructions, when executed by a processor, implement the steps of the video data processing method.

Details of one or more embodiments of the present application are set forth in the following drawings and description. Other features and advantages of the present application will become apparent from the specification, the drawings and the claims.

BRIEF DESCRIPTION OF THE DRAWINGS

In order to describe the embodiments of the present application more clearly, drawings required to be used in the embodiments will be briefly introduced below. Apparently, the drawings in the illustration below are only some embodiments of the present application. A person of ordinary skill in the art also can obtain other drawings according to the provided drawings without creative work.

FIG. 8 is a schematic structural diagram of a non-transitory computer readable storage medium according to one or more embodiments of the present application.

DETAILED DESCRIPTION

A core of the present application is to provide a video data processing method, system and apparatus, and a computer readable storage medium, which may improve memory utilization efficiency, reduce occupation of a DDR bus bandwidth by a video compression function, and achieve a purpose of improving system performance.

In order that objects, technical solutions and advantages of the embodiments of the present application will become more apparent, the technical solutions in the embodiments of the present application will now be described clearly and completely with reference to accompanying drawings in the embodiments of the present application. It is obvious that the described embodiments are merely some, but not all, embodiments of the present application. Based on the embodiments of the present application, all other embodiments obtained by a person of ordinary skill in the art without creative work shall fall within the protection scope of the present application.

Figure 1:
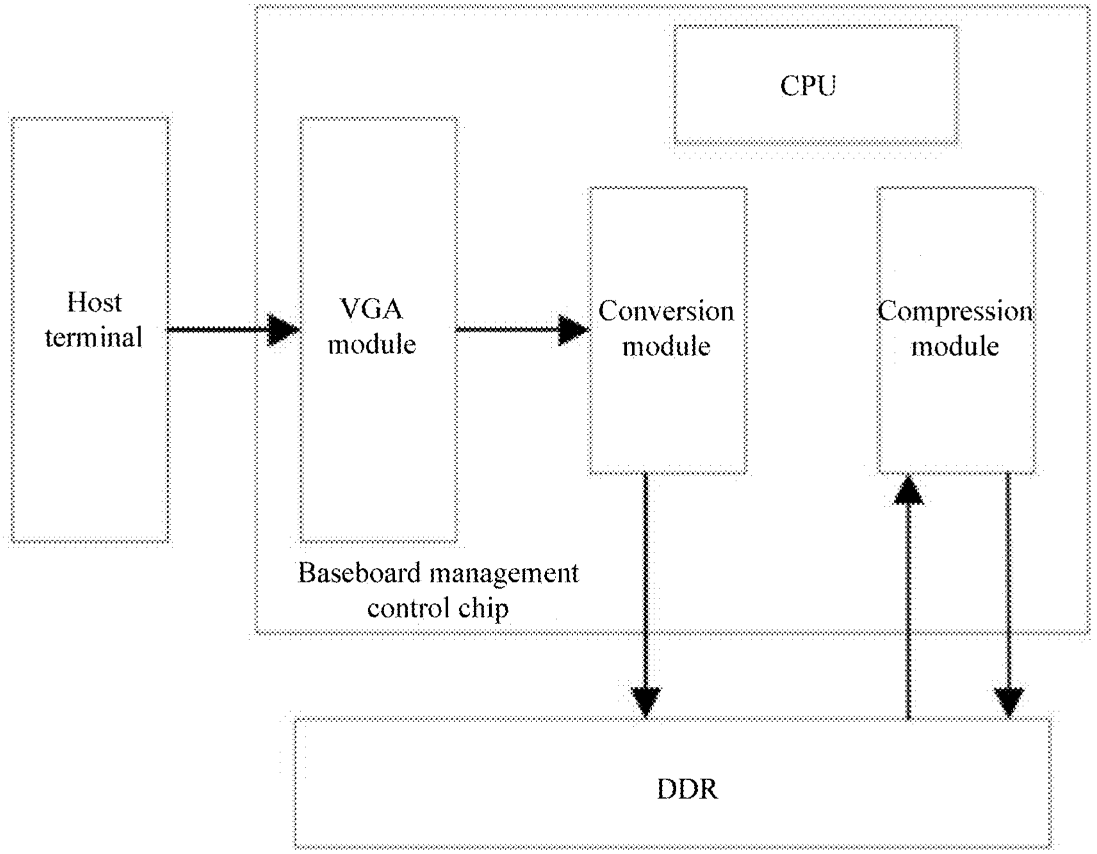
FIG. 1 is a schematic diagram of a processing flow of a video compression system in the prior art.
Figure 2:
FIG. 2 is a schematic structural diagram of a video compression system according to one or more embodiments.
Figure 2:
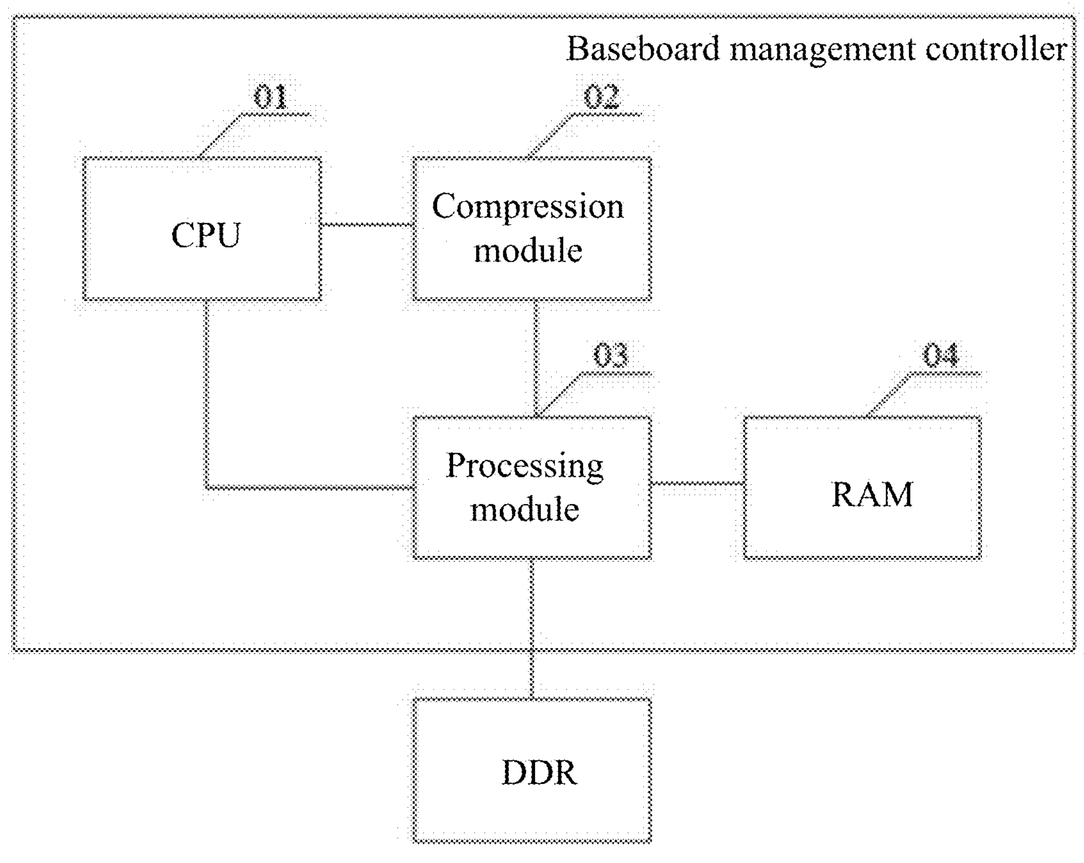
Figure 3:
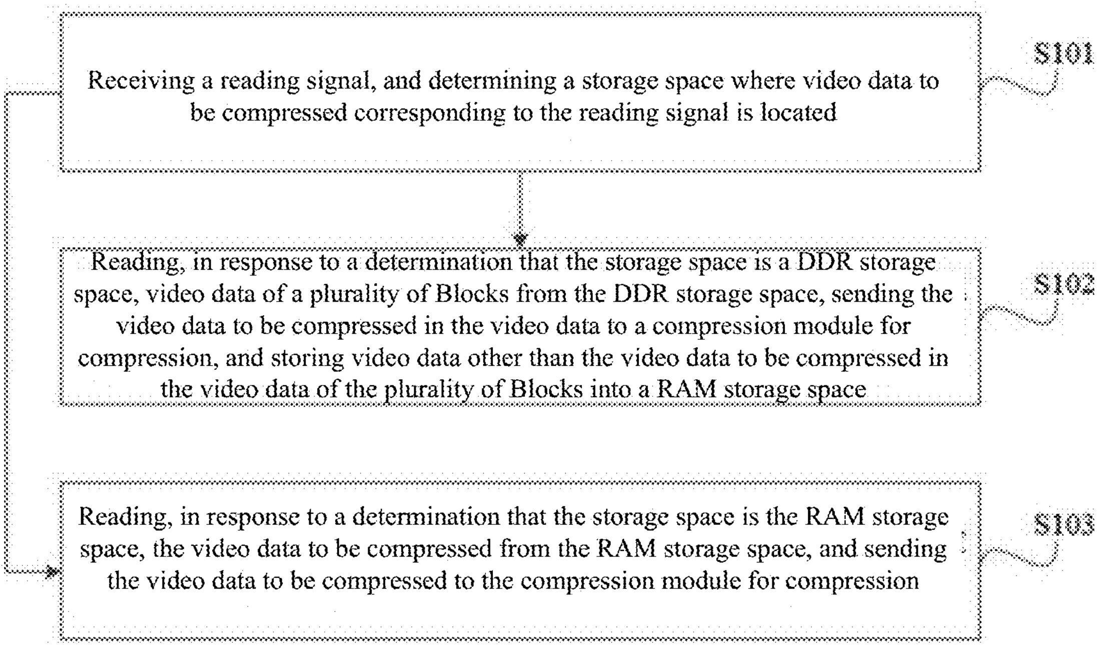
FIG. 3 is a flow chart of steps of a video data processing method according to one or more embodiments.

In order to facilitate understanding of a video data processing method proposed in the present application, a video compression system applicable to the video data processing method is described. The video compression system may be realized by a baseboard management control chip. Referring to FIG. 2, the video compression system includes a CPU 01, a compression module 02, a processing module 03, and an on-chip RAM 04. The video data processing method provided in this embodiment may be realized by the processing module. Reference is made to FIG. 3. FIG. 3 is a flow chart of steps of a video data processing method according to one or more embodiments. The video data processing method includes the following steps.

S101: Receiving a reading signal, and determining a storage space where video data to be compressed corresponding to the reading signal is located.

S102: Reading, in response to a determination that the storage space is a DDR storage space, video data of a plurality of Blocks from the DDR storage space, sending the video data to be compressed in the video data to a compression module for compression, and storing video data other than the video data to be compressed in the video data of the plurality of Blocks into a RAM storage space.

S103: Reading, in response to a determination that the storage space is the RAM storage space, the video data to be compressed from the RAM storage space, and sending the video data to be compressed to the compression module for compression.

It should be first explained that regardless of the video compression process being the compression of an H.264 format or the compression of a joint photographic experts group (JPEG) (product of a JPEG standard, which is formulated by the international organization for standardization (ISO) and is a compression standard for continuous-tone still images) format, video data is required to be inputted in the form of Blocks instead of being inputted in rows. Therefore, it is necessary to first store the video data sent from a host terminal into a storage space corresponding to an off-chip DDR for Block conversion. The video data to be compressed in this step is actually video data of one Block.

It should be understood that after receiving original video data sent by the host terminal, the original video data is first converted into video data in an RGB format, and then the video data in the RGB format is converted into video data in a YUV format through color space conversion. Finally, the video data in the YUV format is respectively stored into the storage space corresponding to the DDR. In other words, components Y in the video data are stored into a memory space with Y_addr as a start address in the DDR, components U in the video data are stored into a memory space with U_addr as a start address in the DDR, and components V in the video data are stored into the memory space with V_addr as a start address in the DDR, where Y_addr, U_addr, and V_addr are different according to different SoC (System on Chip) systems (which may be defined by users). Meanwhile, the CPU allocates the three addresses to the compression module, whereby the compression module outputs a reading signal.

Figure 4:
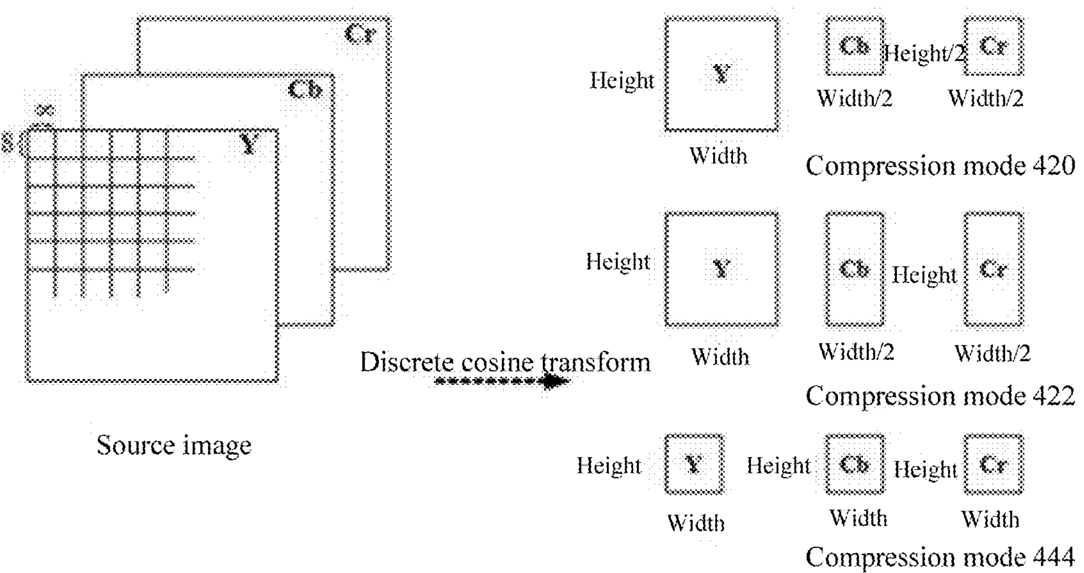
FIG. 4 is a schematic diagram of a Block according to one or more embodiments.

In one or more embodiments, with reference to FIG. 4, the Block is described in different compression configuration modes. Each small box on a right side in FIG. 4 represents 8×8 pixels points on a left side, Cb is component U, and Cr is component V. For example, the compression configuration mode is YUV420. Block Y represents component Y of four 8×8 pixel points, Block Cb represents component U of one 8×8 block, and Block Cr represents component V of one 8×8 block. In other words, in the case where the current compression configuration mode is YUV420, the compression module generates an address order of reading 16×16 component Y, an address order of 8×8 component U, and an address order of 8×8 component V. In the case where the current compression configuration mode is YUV422, the compression module generates an address order of reading 16×16 component Y, an address order of 8×16 component U, and an address order of 8×16 component V. In the case where the current compression configuration mode is YUV444, the compression module generates an address order of reading 8×8 component Y, an address order of 8×8 component U, and an address order of 8×8 component V.

In one or more embodiments, a reading policy for reading the video data in the YUV format from the memory space of the DDR each time is as follows: reading components Y of a plurality of Blocks, components U of the plurality of Blocks, and components V of the plurality of Blocks respectively, sequentially transmitting component Y of one Block, component U of one Block, and component V of one Block, corresponding to a current reading signal, to the compression module, and writing remaining components, components U, and components V of the current reading signal into the storage space corresponding to the RAM respectively. Based on this, after receiving the reading signal outputted by the compression module, the processing module first determines the storage space where the video data to be compressed corresponding to the read signal is located. The storage space where the video data to be compressed may be the DDR storage space or the RAM storage space. If it is determined that the storage space is the DDR storage space, a step of reading video data from the DDR storage space is performed. If it is determined that the storage space is the RAM storage space, component Y of one Block, component U of one Block, and component V of one Block, corresponding to the current reading signal, are sequentially transmitted to the compression module from the RAM.

For example, when the compression configuration mode is YUV420, for component Y, it is assumed that components Y of three Blocks are read from the DDR at one time, component Y of one Block corresponding to the current reading signal is transmitted to the compression module, and components Y of remaining two Blocks are stored into Y_RAM. Then, when the reading signal is received next time, component Y of one Block may be directly acquired from Y_RAM. In other words, data of the three Blocks may be read at one time by reading the DDR, and the two Blocks are cached, which will further increase an amount of data read and written for the DDR at one time, increase a reading burst length of the DDR, improve efficiency of burst access, and improve efficiency of memory usage.

It can be seen that according to the video data processing method provided by this embodiment, when a reading operation is performed from the DDR storage space, the video data of the plurality of Blocks is read at one time, whereby the amount of data read and written for the DDR at one time may be improved, the efficiency of burst access may be improved, and the efficiency of memory usage may be improved. Meanwhile, RAM resources of a system on chip are used for temporarily storing the video data read from the DDR and not transmitted to the compression module, whereby when a next reading signal is received, the video data to be compressed may be read directly from the RAM, and a reading count of the DDR may be reduced, thereby greatly reducing an occupation of DDR bus bandwidth by a video compression function, using the DDR bus bandwidth by other processes running on a CPU, and achieving the purpose of improving system performance.

On the basis of the above-mentioned embodiments, the video data processing method further includes: acquiring a compression configuration mode; determining, based on the compression configuration mode, data to be stored in video data in a YUV format; and storing the data to be stored into the DDR storage space.

In one or more embodiments, a compression configuration mode is first acquired. In different compression configuration modes, data to be stored corresponding to each component of YUV is also different. First, video data is pre-selected and then stored into the storage space of the DDR. On the one hand, the storage space of the DDR is reduced. On the other hand, it is convenient for subsequent reading.

In one or more embodiments, the following provides a detailed description of a scheme for storing video data into DDR in different compression configuration modes.

For component Y, all components Y in all compression configuration modes are stored into a memory space with Y_addr as a start address in the DDR.

For component U, all components U in a compression configuration mode YUV444 are stored into a memory space with U_addr as a start address in the DDR.

Components U in even-numbered rows (or even-numbered columns/odd-numbered rows/odd-numbered columns, where the principle is that two components Y share one component U) in a compression configuration mode YUV422 are stored into a memory space with U_addr as a start address in the DDR. Components U in even-numbered rows and even-numbered columns (or odd-numbered rows and odd-numbered columns, or even-numbered rows and odd-numbered columns, or odd-numbered rows and even-numbered columns, where the principle is that four components Y share one component U) in a compression configuration mode YUV420 are stored into the memory space with U_addr as the start address in the DDR.

For component V, all components V in the compression configuration mode YUV444 are stored into a memory space with V_addr as a start address in the DDR. Components V in even-numbered rows (even-numbered columns/odd-numbered rows/odd-numbered columns, where the principle is that two components Y share one component V) in the compression configuration mode YUV422 are stored into a memory space with V_addr as a start address in the DDR. Components V in even-numbered rows and even-numbered columns (or odd-numbered rows and odd-numbered columns, even-numbered rows and odd-numbered columns, or odd-numbered rows and even-numbered columns, where the principle is that four components Y share one component V) in a compression configuration mode YUV420 are stored into the memory space with V_addr as the start address in the DDR.

Correspondingly, the process of storing the remaining data of components Y, components U, and components V after each reading of the DDR into the storage space of the RAM is as follows:

writing remaining data Y into Y_RAM. It should be noted that in the mode YUV420, the remaining data Y in row $16m_1+n_1$ is written into row $n_1$ of Y_RAM, where $m_1=0, 1, 2, 3, \ldots$ and $n_1=0, 1, 2, 3, \ldots, 15$. In other words, the remaining data Y in row 0/16/32/48 . . . is written into row 0 of Y_RAM, the remaining data Y in row 1/17/33/49 . . . is written into row 1 of Y_RAM, and so on, until the remaining data Y in row 15/31/47/63 . . . is written into row 15 of Y_RAM.

In the case where even-numbered rows and even-numbered columns of components UV are retained, the remaining data U in row $16m_2+2n_2$ and column $16m_2+2n_2$ is written into row $n_2$ of U_RAM, and the remaining data V in row $16m_2+2n_2$ and column $16m_2+2n_2$ is written into row $n_2$ of V_RAM, where $m_2=0, 1, 2, 3, \ldots$ and $n_2=0, 1, 2, 3, \ldots, 7$.

In one or more embodiments, the remaining data U in row 0/16/32/48 . . . and column 0/16/32/48 . . . is written into row 0 of U_RAM, the remaining data U in row 2/18/34/50 . . . and column 2/18/34/50 is written into row 1 of U_RAM, the remaining data U in row 4/20/36/52 . . . and column 4/20/36/52 is written into row 2 of U_RAM, and so on, until the remaining data U in row 14/30/46/62 . . . and column 14/30/46/62 is written into row 7 of U_RAM.

The remaining data V in row 0/16/32/48 . . . and column 0/16/32/48 . . . is written into row 0 of V_RAM, the remaining data V in row 2/18/34/50 . . . and column 2/18/34/50 is written into row 1 of V_RAM, the remaining data V in row 4/20/36/52 . . . and column 4/20/36/52 is written into row 2 of V_RAM, and so on, until the remaining data V in row 14/30/46/62 . . . and column 14/30/46/62 is written into row 7 of V_RAM.

In the mode YUV422, the remaining data Y in row $16m_3+n_3$ is written into row $n_3$ of Y_RAM, where $m_3=0, 1, 2, 3, \ldots$ and $n_3=0, 1, 2, 3, \ldots, 15$. In other words, the remaining data Y in row 0/16/32/48 . . . is written into row 0 of Y_RAM, the remaining data Y in row 1/17/33/49 . . .

is written into row 1 of Y_RAM, and so on, until the remaining data Y in row 15/31/47/63 . . . is written into row 15 of Y_RAM.

In the case where even-numbered columns of components UV are retained, the remaining data U in row $16m_4+n_4$ and column $2k_1$ is written into row $n_4$ of U_RAM, and the remaining data V in row $16m_4+n_4$ and column $2k_1$ is written into row $n_4$ of V_RAM, where $m_4$=0, 1, 2, 3, . . . , $n_4$=0, 1, 2, 3, . . . , 15, and $k_1$=0, 1, 2, 3, . . . , 7.

In one or more embodiments, the remaining data U in row 0/16/32/48 . . . and column 0/2/4/6 . . . 14 is written into row 0 of U_RAM, the remaining data U in row 1/17/33/49 . . . and column 0/2/4/6 . . . 14 is written into row 1 of U_RAM, and so on, until the remaining data U in row 15/31/47/63 . . . and column 0/2/4/6 . . . 14 is written into row 15 of U_RAM.

The remaining data V in row 0/16/32/48 . . . and column 0/2/4/6 . . . 14 is written into row 0 of V_RAM, the remaining data V in row 1/17/33/49 . . . and column 0/2/4/6 . . . 14 is written into row 1 of V_RAM, and so on, until the remaining data V in row 15/31/47/63 . . . and column 15/31/47/63 is written into row 15 of V_RAM.

In the mode YUV444, the remaining data Y in row $8m_5+n_5$ is written into row $n_5$ of Y_RAM, the remaining data U in row $8m_5+n_5$ is written into row $n_5$ of U_RAM, and the remaining data V in row $8m_5+n_5$ is written into row $n_5$ of V_RAM, where $m_5$=0, 1, 2, 3, . . . and $n_5$=0, 1, 2, 3, . . . , 7.

In one or more embodiments, the remaining data Y in row 0/8/16/24 . . . is written into row 0 of Y_RAM, the remaining data Y in row 1/9/17/25 . . . is written into row 1 of Y_RAM, and so on, until the remaining data Y in row 7/15/23/31 . . . is written into row 7 of Y_RAM. The remaining data U in row 0/8/16/24 . . . is written into row 0 of U_RAM, the remaining data U in row 1/9/17/25 . . . is written into row 1 of U_RAM, and so on, until the remaining data U in row 7/15/23/31 . . . is written into row 7 of U_RAM. The remaining data V in row 0/8/16/24 . . . is written into row 0 of V_RAM, the remaining data V in row 1/9/17/25 . . . is written into row 1 of V_RAM, and so on, until the remaining data V in row 7/15/23/31 . . . is written into row 7 of V_RAM.

As one or more embodiments, the video data processing method further includes: acquiring a compression configuration mode; and determining, based on the compression configuration mode, the number of Blocks to be read.

In one or more embodiments, with reference to the above, the compression configuration modes include YUV444, YUV422, and YUV420. The number of Blocks corresponding to different compression configuration modules and the amount of data included in one Block are also different. For example, in the mode YUV420, components Y of two Blocks (16×16) are first read, components U of two Blocks (8×8) are read, and components V of two Blocks (8×8) are read. In the mode YUV422, components Y of two Blocks (16×16) are first read, components U of two Blocks (8×16) are read, and components V of two Blocks (8×16) are read. In the mode YUV444, components Y of two Blocks (8×8) are first read, components U of two Blocks (8×8) are read, and components V of two Blocks (8×8) are read.

As one or more embodiments, the video data processing method further includes: acquiring a RAM bit width. The process of determining, based on the compression configuration mode, the number of Blocks to be read includes: determining, based on the compression configuration mode and the RAM bit width, the number of Blocks to be read.

In one or more embodiments, the number of Blocks to be read may be determined according to resources available from an on-chip RAM. For example, Y_RAM is 256 bit. In other words, data of two Blocks may be cached. Then, data of three Blocks may be read at one time, and the data of two Blocks may be cached.

As one or more embodiments, after storing the video data other than the video data to be compressed into the RAM storage space, the video data processing method further includes:

recording a reading count of reading the video data to be compressed from the RAM storage space.

Correspondingly, the process of determining a storage space where video data to be compressed corresponding to the reading signal is located includes: in response to the reading signal being received and the reading count reaching a preset count, determining that the storage space where the video data to be compressed corresponding to the reading signal is located is the DDR storage space; and in response to the reading signal being received and the reading count not reaching the preset count, determining that the storage space where the video data to be compressed corresponding to the reading signal is located is the RAM storage space.

In one or more embodiments, after reading video data of a plurality of Blocks in the DDR, the processing module stores the video data not transmitted to the compression module into the storage space corresponding to the RAM. After receiving the next trigger of the compression module, the corresponding Block is read from the RAM. The processing module records a reading count of reading the corresponding Block from the RAM, and continues to read the video data of the corresponding Block from the RAM in response to the currently recorded reading count not reaching a preset count when the reading signal sent by the compression module is received. The above-mentioned policy of reading video data from the DDR is adopted in response to the currently recorded reading count reaching the preset count.

The preset count may be determined according to the number of Blocks read from the DDR each time. For example, if video data of three Blocks may be read from the DDR each time, the preset count may be set to two. Assuming that the reading signal sent by the compression module is received for the first time, it is determined that a storage space where the video data to be compressed corresponding to the current reading signal is the DDR storage space. The data of three Blocks is read from the DDR, and the data of the Block corresponding to the current reading signal is transmitted to the compression module. The reading signal sent by the compression module is received for the second time. At this moment, the reading count is 0, and does not reach the preset count, and it is determined that the storage space where the video data to be compressed corresponding to the current reading signal is the RAM storage space. The data of the Block corresponding to the current reading signal is read from the RAM storage space and transmitted to the compression module, and the reading count is recorded as 1. The reading signal sent by the compression module is received for the third time. At this moment, the reading count is 1, and does not reach the preset count, and it is determined that the storage space where the video data to be compressed corresponding to the current reading signal is the RAM storage space. The data of the Block corresponding to the current reading signal is still read from the RAM storage space and transmitted to the compression module, and the reading count is recorded as 2. The reading signal sent by the compression module is received for the fourth time. At this moment, the reading count is 2, and reaches the preset count, it is determined that the storage space where the video data to be compressed corresponding to the current reading signal is the DDR storage space, the data of three Blocks is then read from the DDR, and so on.

Figure 5:
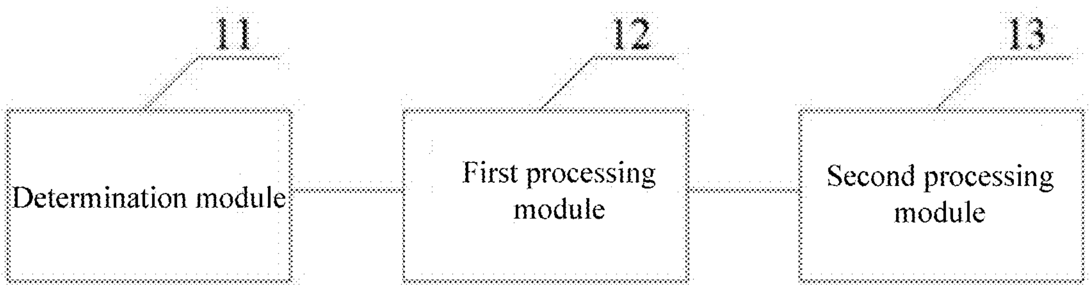
FIG. 5 is a schematic structural diagram of a video data processing system according to one or more embodiments.

Reference is made to FIG. 5. FIG. 5 is a schematic structural diagram of a video data processing system according to the present application. The video data processing system includes a determination module 11, a first processing module 12 and a second processing module 13.

The determination module 11 is configured to receive a reading signal, and determine a storage space where video data to be compressed corresponding to the reading signal is located.

The first processing module 12 is configured to read, in response to the determination module 11 determining that the storage space is a DDR storage space, video data of a plurality of Blocks from the DDR storage space, send the video data to be compressed in the video data to a compression module for compression, and store video data other than the video data to be compressed in the video data of the plurality of Blocks into a RAM storage space.

The second processing module 13 is configured to read, in response to the determination module 11 determining that the storage space is the RAM storage space, the video data to be compressed from the RAM storage space, and send the video data to be compressed to the compression module for compression.

It can be seen that according to the video data processing system provided by this embodiment, when a reading operation is performed from the DDR storage space, the video data of the plurality of Blocks is read at one time, whereby the amount of data read and written for the DDR at one time may be improved, the efficiency of burst access may be improved, and the efficiency of memory usage may be improved. Meanwhile, RAM resources of a system on chip are used for temporarily storing the video data read from the DDR and not transmitted to the compression module, whereby when a next reading signal is received, the video data to be compressed may be read directly from the RAM, and the reading count of the DDR may be reduced, thereby greatly reducing the occupation of DDR bus bandwidth by a video compression function, using the DDR bus bandwidth by other processes running on a CPU, and achieving the purpose of improving system performance.

As one or more embodiments, the video data processing system further includes a first acquisition module (not shown) and a first preprocessing module (not shown).

The first acquisition module is configured to acquire a compression configuration mode.

The first preprocessing module is configured to determine, based on the compression configuration mode, data to be stored in video data in a YUV format, and store the data to be stored into the DDR storage space.

As one or more embodiments, the video data processing system further includes a second acquisition module (not shown) and a second preprocessing module (not shown).

The second acquisition module is configured to acquire a compression configuration mode.

The second preprocessing module is configured to determine, based on the compression configuration mode, the number of Blocks to be read.

As one or more embodiments, the video data processing system further includes a third acquisition module (not shown).

The third acquisition module is configured to acquire a RAM bit width.

The second preprocessing module is configured to determine, based on the compression configuration mode and the RAM bit width, the number of Blocks to be read.

As one or more embodiments, the compression configuration mode is any one of a YUV420 compression configuration mode, a YUV422 compression configuration mode and a YUV444 compression configuration mode.

As one or more embodiments, the video data processing system further includes a recording module (not shown).

The recording module is configured to record a reading count of reading the video data to be compressed from the RAM storage space.

Correspondingly, the process of determining a storage space where video data to be compressed corresponding to the reading signal is located includes:

- in response to the reading signal being received and the reading count reaching a preset count, determining that the storage space where the video data to be compressed corresponding to the reading signal is located is the DDR storage space; and
- in response to the reading signal being received and the reading count not reaching the preset count, determining that the storage space where the video data to be compressed corresponding to the reading signal is located is the RAM storage space.

Figure 6:
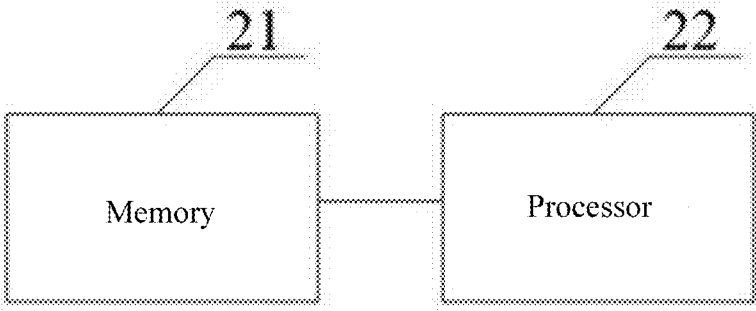
FIG. 6 is a schematic structural diagram of the video data processing apparatus according to one or more embodiments.

In addition, reference is made to FIG. 6. FIG. 6 is a schematic structural diagram of a video data processing apparatus according to the present application. The video data processing apparatus includes:

- a memory 21, configured to store computer readable instructions; and
- one or more processors 22, configured to implement the steps of the video data processing method as described in any one of the embodiments above when executing the computer readable instructions.

In one or more embodiments, the memory 21 includes a non-transitory storage medium and an internal memory 21. The non-transitory storage medium stores an operating system and computer readable instructions. The internal memory 21 provides an environment for the operation of the operating system and the computer readable instructions in the non-transitory storage medium. The processor 22, when executing the computer readable instructions stored in the memory 21, may implement the following steps: receiving a reading signal, and determining a storage space where video data to be compressed corresponding to the reading signal is located; in response to a determination that the storage space is a DDR storage space, reading video data of a plurality of Blocks from the DDR storage space, sending the video data to be compressed in the video data to a compression module for compression, and storing video data other than the video data to be compressed in the video data of the plurality of Blocks into a RAM storage space; and in response to a determination that the storage space is the RAM storage space, reading the video data to be compressed from the RAM storage space, and sending the video data to be compressed to the compression module for compression.

It can be seen that according to the video data processing apparatus provided by this embodiment, when a reading operation is performed from the DDR storage space, the video data of the plurality of Blocks is read at one time, whereby the amount of data read and written for the DDR at one time may be improved, the efficiency of burst access may be improved, and the efficiency of memory usage may be improved. Meanwhile, RAM resources of a system on chip are used for temporarily storing the video data read from the DDR and not transmitted to the compression module, whereby when a next reading signal is received, the video data to be compressed may be read directly from the RAM, and the reading count of the DDR may be reduced, thereby greatly reducing the occupation of DDR bus bandwidth by a video compression function, using the DDR bus bandwidth by other processes running on a CPU, and achieving the purpose of improving system performance.

As one or more embodiments, the processor 22, when executing the computer readable instructions stored in the memory 21, may implement the following steps: acquiring a compression configuration mode; determining, based on the compression configuration mode, data to be stored in video data in a YUV format; and storing the data to be stored into the DDR storage space. The compression configuration mode is any one of a YUV420 compression configuration mode, a YUV422 compression configuration mode and a YUV444 compression configuration mode.

As one or more embodiments, the processor 22, when executing the computer readable instructions stored in the memory 21, may implement the following steps: acquiring a compression configuration mode; and determining, based on the compression configuration mode, the number of Blocks to be read. The compression configuration mode is any one of a YUV420 compression configuration mode, a YUV422 compression configuration mode and a YUV444 compression configuration mode.

As one or more embodiments, the processor 22, when executing the computer readable instructions stored in the memory 21, may implement the following steps: acquiring a RAM bit width; and determining, based on the compression configuration mode and the RAM bit width, the number of Blocks to be read.

As one or more embodiments, the processor 22, when executing the computer readable instructions stored in the memory 21, may implement the following steps: recording a reading count of reading the video data to be compressed from the RAM storage space; in response to the reading signal being received and the reading count reaching a preset count, determining that the storage space where the video data to be compressed corresponding to the reading signal is located is the DDR storage space; and in response to the reading signal being received and the reading count not reaching the preset count, determining that the storage space where the video data to be compressed corresponding to the reading signal is located is the RAM storage space.

Figure 7:
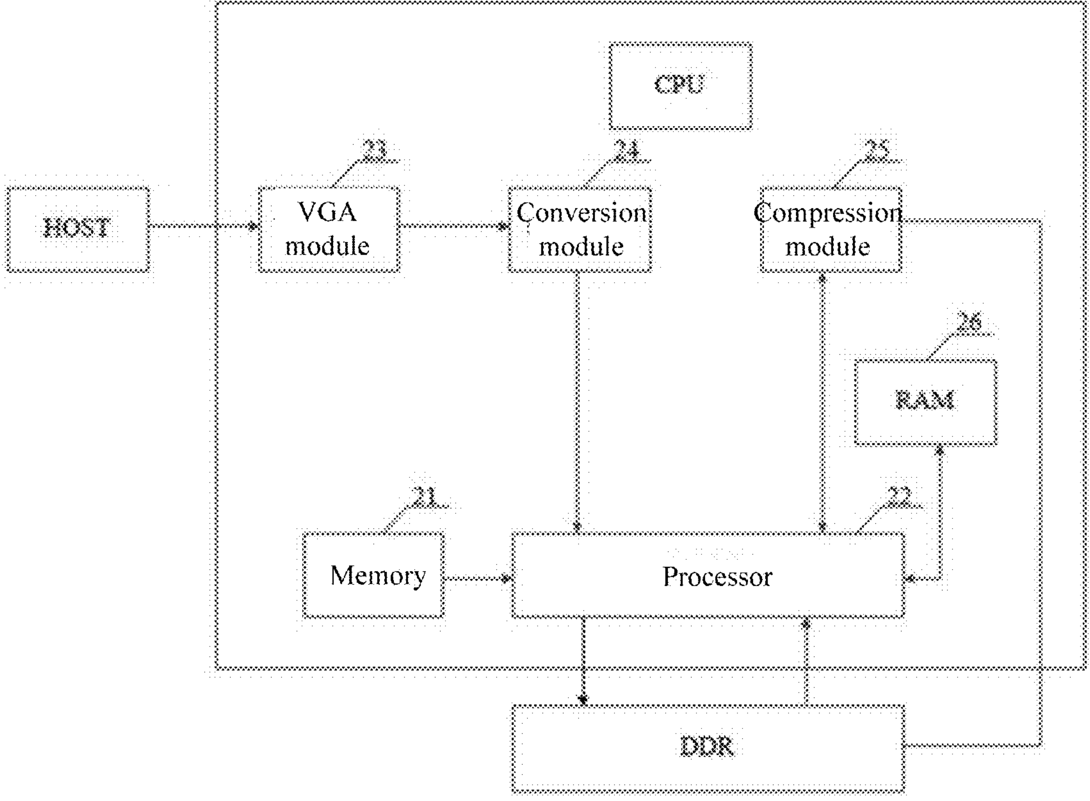
FIG. 7 is a schematic structural diagram of the video data processing apparatus according to one or more embodiments.

On the basis of the above-mentioned embodiment, as one or more embodiments, reference is made to FIG. 7. FIG. 7 is a structural diagram of another video data processing apparatus according to an embodiment of the present application. The video data processing apparatus further includes:

- a VGA module 23, configured to convert initial video data sent by a host into video data in an RGB format;
- a conversion module 24, configured to convert the video data in the RGB format into video data in a YUV format;
- a compression module 25, configured to send a reading signal, receive video data to be compressed, and compress the video data to be compressed; and
- a RAM 26, configured to store the video data in the YUV format read from a DDR storage space by the processor 22.

Figure 8:
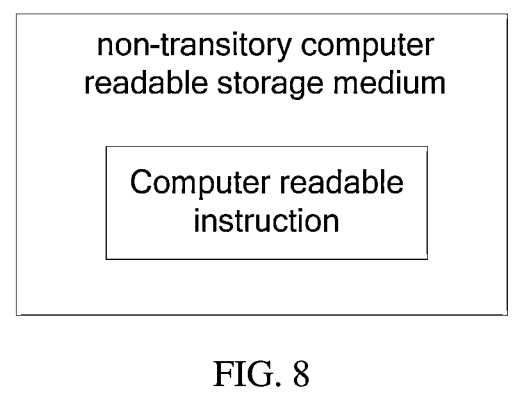

In addition, as shown in FIG. 8, the present application also provides a non-transitory computer readable storage medium. The non-transitory computer readable storage medium has computer readable instructions stored therein. The computer readable instructions, when executed by a processor, implement the steps of the video data processing method as described in any one of the embodiments above.

In one or more embodiments, the non-transitory computer readable storage medium may include: a USB flash drive, a removable hard disk, a read-only memory (ROM), a RAM, a magnetic disk, or an optical disk, and other media which may store program codes. The non-transitory storage medium has computer readable instructions stored therein. The computer readable instructions, when executed by the processor, implement the following steps: receiving a reading signal, and determining a storage space where video data to be compressed corresponding to the reading signal is located; in response to a determination that the storage space is a DDR storage space, reading video data of a plurality of Blocks from the DDR storage space, sending the video data to be compressed in the video data to a compression module for compression, and storing video data other than the video data to be compressed in the video data of the plurality of Blocks into a RAM storage space; and in response to a determination that the storage space is the RAM storage space, reading the video data to be compressed from the RAM storage space, and sending the video data to be compressed to the compression module for compression.

It can be seen that in this embodiment, when a reading operation is performed from the DDR storage space, the video data of the plurality of Blocks is read at one time, whereby the amount of data read and written for the DDR at one time may be improved, the efficiency of burst access may be improved, and the efficiency of memory usage may be improved. Meanwhile, RAM resources of a system on chip are used for temporarily storing the video data read from the DDR and not transmitted to the compression module, whereby when a next reading signal is received, the video data to be compressed may be read directly from the RAM, and the reading count of the DDR may be reduced, thereby greatly reducing the occupation of DDR bus bandwidth by a video compression function, using the DDR bus bandwidth by other processes running on a CPU, and achieving the purpose of improving system performance.

As one or more embodiments, computer subprograms stored in the non-transitory computer readable storage medium, when executed by the processor, may implement the following steps: acquiring a compression configuration mode; determining, based on the compression configuration mode, data to be stored in video data in a YUV format; and storing the data to be stored into the DDR storage space. The compression configuration mode is any one of a YUV420 compression configuration mode, a YUV422 compression configuration mode and a YUV444 compression configuration mode.

As one or more embodiments, computer subprograms stored in the non-transitory computer readable storage medium, when executed by the processor, may implement the following steps: acquiring a compression configuration mode; and determining, based on the compression configuration mode, the number of Blocks to be read. The compression configuration mode is any one of a YUV420 compression configuration mode, a YUV422 compression configuration mode and a YUV444 compression configuration mode.

As one or more embodiments, computer subprograms stored in the non-transitory computer readable storage medium, when executed by the processor, may implement the following steps: acquiring a RAM bit width; and determining, based on the compression configuration mode and the RAM bit width, the number of Blocks to be read.

As one or more embodiments, computer subprograms stored in the non-transitory computer readable storage medium, when executed by the processor, may implement the following steps: recording a reading count of reading the video data to be compressed from the RAM storage space; in response to the reading signal being received and the reading count reaching a preset count, determining that the storage space where the video data to be compressed corresponding to the reading signal is located is the DDR storage space; and in response to the reading signal being received and the reading count not reaching the preset count, determining that the storage space where the video data to be compressed corresponding to the reading signal is located is the RAM storage space.

It should also be noted that relational terms such as first and second in this specification are used solely to distinguish one entity or operation from another entity or operation without necessarily requiring or implying any actual such relationship or order between such entities or operations. Moreover, the terms "include", "contain", or any other variations thereof are intended to cover a non-exclusive inclusion, such that a process, method, article, or device including a series of elements not only includes those elements, but also includes other elements that are not explicitly listed, or also includes elements inherent to such process, method, article, or device. It is not excluded, without more constraints, that additional identical elements exist in the process, method, article, or device including elements defined by a sentence "including a . . . ".

The above description of the disclosed embodiments enables a person skilled in the art to practice or use the present application. Various modifications to these embodiments will be obvious to a person skilled in the art, and the general principles defined herein may be implemented in other embodiments without departing from the spirit or scope of the present application. Therefore, the present application will not be limited to the embodiments shown herein but is intended to conform to the widest scope consistent with the principles and novel features disclosed herein.

The invention claimed is:

1. A video data processing method, comprising:

receiving a reading signal, and determining a storage space where video data to be compressed corresponding to the reading signal is located;

reading, in response to a determination that the storage space is a double data rate (DDR) storage space, video data of a plurality of Blocks from the DDR storage space, sending the video data to be compressed in the video data to a compression module for compression, and storing video data other than the video data to be compressed in the video data of the plurality of Blocks into a random access memory (RAM) storage space; and reading, in response to a determination that the storage space is the RAM storage space, the video data to be compressed from the RAM storage space, and sending the video data to be compressed to the compression module for compression;

wherein after storing the video data other than the video data to be compressed into the RAM storage space, the video data processing method further comprises:

recording a reading count of reading the video data to be compressed from the RAM storage space;

the determining a storage space where video data to be compressed corresponding to the reading signal is located comprises:

in response to the reading signal being received and the reading count reaching a preset count, determining that the storage space where the video data to be compressed corresponding to the reading signal is located is the DDR storage space; and in response to the reading signal being received and the reading count not reaching the preset count, determining that the storage space where the video data to be compressed corresponding to the reading signal is located is the RAM storage space.

2. The video data processing method according to claim 1, wherein the video data to be compressed is video data of one Block.

3. The video data processing method according to claim 1, further comprising:

acquiring a compression configuration mode;

determining, based on the compression configuration mode, data to be stored in video data in a YUV format; and storing the data to be stored into the DDR storage space.

4. The video data processing method according to claim 3, wherein the compression configuration mode is a YUV420 compression configuration mode, and the storing the data to be stored into the DDR storage space comprises:

storing components Y of the data to be stored into a memory space with Y_addr as a start address in a DDR;

storing components U in even-numbered rows and even-numbered columns, odd-numbered rows and odd-numbered columns, even-numbered rows and odd-numbered columns, or odd-numbered rows and even-numbered columns of the data to be stored into a memory space with U_addr as a start address in the DDR; and storing components V in even-numbered rows and even-numbered columns, odd-numbered rows and odd-numbered columns, even-numbered rows and odd-numbered columns, or odd-numbered rows and even-numbered columns of the data to be stored into a memory space with V_addr as a start address in the DDR.

5. The video data processing method according to claim 4, wherein the storing video data other than the video data to be compressed in the video data of the plurality of Blocks into a RAM storage space comprises:

writing remaining data Y in row 16m1+n1 into row n1 of Y_RAM;

writing remaining data U in row 16m2+2n2 and column 16m2+2n2 into row n2 of U_RAM; and writing remaining data V in row 16m2+2n2 and column 16m2+2n2 into row n2 of V_RAM, wherein m1=0, 1, 2, 3, . . . , n1=0, 1, 2, 3, . . . , 15, m2=0, 1, 2, 3, . . . , and n2=0, 1, 2, 3, . . . 7.

6. The video data processing method according to claim 3, wherein the compression configuration mode is a YUV422 compression configuration mode, and the storing the data to be stored into the DDR storage space comprises:

storing components Y of the data to be stored into a memory space with Y_addr as a start address in a DDR;

storing components U in even-numbered rows, even-numbered columns, odd-numbered rows or odd-numbered columns of the data to be stored into a memory space with U_addr as a start address in the DDR; and storing components V in even-numbered rows, even-numbered columns, odd-numbered rows or odd-numbered columns of the data to be stored into a memory space with V_addr as a start address in the DDR.

7. The video data processing method according to claim 6, wherein the storing video data other than the video data to be compressed in the video data of the plurality of Blocks into a RAM storage space comprises:

writing remaining data Y in row 16m3+n3 into row n3 of Y_RAM;

writing remaining data U in row 16m4+n4 and column 2k1 into row n4 of U_RAM; and writing remaining data V in row 16m4+n4 and column 2k1 into row n4 of V_RAM, wherein m3-0, 1, 2, 3, . . . , n3-0, 1, 2, 3, . . . , 15, m4=0, 1, 2, 3, . . . , n4-0, 1, 2, 3, . . . , 15, and k1=0, 1, 2, 3, . . . 7.

8. The video data processing method according to claim 3, wherein the compression configuration mode is a YUV444 compression configuration mode, and the storing the data to be stored into the DDR storage space comprises:

storing components Y of the data to be stored into a memory space with Y_addr as a start address in a DDR;

storing components U of the data to be stored into a memory space with U_addr as a start address in the DDR; and storing components V of the data to be stored into a memory space with V_addr as a start address in the DDR.

9. The video data processing method according to claim 8, wherein the storing video data other than the video data to be compressed in the video data of the plurality of Blocks into a RAM storage space comprises:

writing remaining data Y in row 8m5+n5 into row n5 of Y_RAM;

writing remaining data U in row 8m5+n5 into row n5 of U_RAM; and writing remaining data V in row 8m5+n5 into row n5 of V_RAM, wherein m5=0, 1, 2, 3, . . . and n5=0, 1, 2, 3, . . . 7.

10. The video data processing method according to claim 1, further comprising:

acquiring a compression configuration mode; and determining, based on the compression configuration mode, the number of Blocks to be read.

11. The video data processing method according to claim 10, further comprising:

acquiring a RAM bit width, wherein the process of determining, based on the compression configuration mode, the number of Blocks to be read comprises:

determining, based on the compression configuration mode and the RAM bit width, the number of Blocks to be read.

12. The video data processing method according to claim 11, wherein the determining, based on the compression configuration mode and the RAM bit width, the number of Blocks to be read comprises:

determining, according to the compression configuration mode and resources available from an on-chip RAM, the number of Blocks to be read.

13. The video data processing method according to claim 10, wherein the compression configuration mode is any one of a YUV420 compression configuration mode, a YUV422 compression configuration mode and a YUV444 compression configuration mode.

14. The video data processing method according to claim 1, further comprising:

determining the number of Blocks according to the video data read from the DDR storage space.

15. A video data processing apparatus, comprising:

a memory, storing computer readable instructions; and one or more processors, configured to execute the computer-readable instructions, wherein the one or more processors, upon execution of the computer-readable instructions, is configured to:

receive a reading signal, and determine a storage space where video data to be compressed corresponding to the reading signal is located;

read, in response to a determination that the storage space is a double data rate (DDR) storage space, video data of a plurality of Blocks from the DDR storage space, send the video data to be compressed in the video data to a compression module for compression, and store video data other than the video data to be compressed in the video data of the plurality of Blocks into a random access memory (RAM) storage space; and read, in response to a determination that the storage space is the RAM storage space, the video data to be compressed from the RAM storage space, and send the video data to be compressed to the compression module for compression;

wherein after storage of the video data other than the video data to be compressed into the RAM storage space, the one or more processors is configured to:

record a reading count of reading the video data to be compressed from the RAM storage space;

wherein to determine a storage space where video data to be compressed corresponding to the reading signal is located, the one or more processors is configured to:

in response to the reading signal being received and the reading count reaching a preset count, determine that the storage space where the video data to be compressed corresponding to the reading signal is located is the DDR storage space; and in response to the reading signal being received and the reading count not reaching the preset count, determine that the storage space where the video data to be compressed corresponding to the reading signal is located is the RAM storage space.

16. The video data processing apparatus according to claim 15, wherein the one or more processor, upon execution of the computer readable instructions, is further configured to:

convert initial video data sent by a host into video data in an RGB format;

convert the video data in the RGB format into video data in a YUV format;

send a reading signal, receive video data to be compressed, and compress the video data to be compressed; and and wherein the apparatus further comprises a random-access memory (RAM) configured to store the video data in the YUV format read from a double data rate (DDR) storage space by the processor.

17. A non-transitory computer readable storage medium, storing computer readable instructions executable by one or more processors, and upon execution by the one or more processors, is configured to cause the one or more processors to:

receive a reading signal, and determine a storage space where video data to be compressed corresponding to the reading signal is located;

read, in response to a determination that the storage space is a double data rate (DDR) storage space, video data of a plurality of Blocks from the DDR storage space, send the video data to be compressed in the video data to a compression module for compression, and store video data other than the video data to be compressed in the video data of the plurality of Blocks into a random access memory (RAM) storage space; and read, in response to a determination that the storage space is the RAM storage space, the video data to be compressed from the RAM storage space, and send the video data to be compressed to the compression module for compression;

wherein after storage of the video data other than the video data to be compressed into the RAM storage space, the computer readable instructions, upon execution by the one or more processors, is further configured to cause the one or more processors to:

record a reading count of reading the video data to be compressed from the RAM storage space;

wherein for the one or more processors to determine a storage space where video data to be compressed corresponding to the reading signal is located, the computer readable instructions, upon execution by the one or more processors, is configured to cause the one or more processors to:

in response to the reading signal being received and the reading count reaching a preset count, determine that the storage space where the video data to be compressed corresponding to the reading signal is located is the DDR storage space; and in response to the reading signal being received and the reading count not reaching the preset count, determine that the storage space where the video data to be compressed corresponding to the reading signal is located is the RAM storage space.

18. The video data processing method according to claim 4, wherein the Y_addr, the U_addr, and the V_addr are disposed different according to different SoC (System on Chip) systems.

19. The video data processing method according to claim 13, wherein a number of Blocks corresponding to different compression configuration modules and an amount of data in one Block are different.

* * * * *